(12) United States Patent
MacKenzie (10) Patent No.: US 6,913,240 B1
(45) Date of Patent: Jul. 5, 2005

(54) ELECTROHYDRAULIC CONTROL UNIT

(75) Inventor: Roy MacKenzie, Stonehaven (GB)

(73) Assignee: Halliburton Energy Services, Inc., Houston, TX (US)

( * ) Notice: Subject to any disclaimer, the term of this patent is extended or adjusted under 35 U.S.C. 154(b) by 134 days.

(21) Appl. No.: 09/591,935

(22) Filed: Jun. 12, 2000

Related U.S. Application Data (62) Division of application No. 09/089,921, filed on Jun. 3, 1998, now Pat. No. 6,102,828.

(51) Int. Cl.$^7$ ............................................. F16K 31/122
(52) U.S. Cl. ........................................ 251/57; 251/63.4
(58) Field of Search ................................... 251/57, 63.4

(56) References Cited

U.S. PATENT DOCUMENTS

| | | | |
|---|---|---|---|
| 3,572,032 A | 3/1971 | Terry | 60/52 |
| 4,215,746 A | 8/1980 | Hallden et al. | 166/53 |
| 4,268,007 A * | 5/1981 | Chittenden | 251/30.02 |
| 4,405,014 A * | 9/1983 | Talafuse | 166/72 |
| 4,463,773 A * | 8/1984 | Kojima et al. | 137/38 |
| 4,744,386 A | 5/1988 | Frazer | 137/315 |
| 4,934,652 A | 6/1990 | Golden | 251/63.6 |
| 5,526,883 A | 6/1996 | Breaux | 166/373 |
| 5,573,063 A | 11/1996 | Morrow | 166/68.5 |
| 5,797,583 A * | 8/1998 | Murata et al. | 251/57 |

OTHER PUBLICATIONS

Service Manual for Model "Leo" Linear Safety Release Electric Actuator, Dresser Oil Tools, P.O. Box 2427, Longview, Texas 75606, USA, Form E-520-1, Rev. 2, May 6, 1997.
Brochure from Rotork Actuation, Brass Mill Lane, Bath, BA1 3JG England.

* cited by examiner

Primary Examiner—John Fox
(74) Attorney, Agent, or Firm—Lawrence R. Youst (57) ABSTRACT

An electrohydraulic control unit for operating an actuator of a hydraulically controllable device is disclosed. The electrohydraulic control unit comprises a housing including a chamber for hydraulic fluid. The housing is coupled to the actuator such that a path for fluid communication between the chamber and the actuator is created. Disposed within the chamber is a piston for regulating the flow of the hydraulic fluid between the chamber and the actuator. An electric motor is securably attached to the housing. The electric motor includes a selectively rotatable shaft. The electrohydraulic control unit also comprises a converter configured to transform the rotational motion of the shaft to translational motion of the piston, thereby controlling the actuation of the hydraulically controllable device.

13 Claims, 5 Drawing Sheets

ELECTROHYDRAULIC CONTROL UNIT

This application is a division of application Ser. No. 09/089,921 filed on Jun. 3, 1998, now U.S. Pat. No. 6,102,828.

TECHNICAL FIELD OF THE INVENTION

This invention relates, in general, to safety systems for the production of oil and gas, and in particular to, an electrohydraulic control unit for operating the hydraulic actuator of, for example, surface safety valves and subsurface safety valves.

BACKGROUND OF THE INVENTION

Formation fluids, including oil and gas produced at a well head are typically conveyed through flow lines to remote processing equipment. It is conventional practice to use surface safety valves which are responsive to changes in operating conditions to automatically shut off flow in the flow lines at the onset of unusual or unscheduled operating conditions. Such surface safety valve installations are designed to automatically close in response to fluctuations in selected conditions in the flow lines, either above or below predetermined settings, such as high and low liquid levels, high and low temperatures, high and low pressures and the like.

Conventional surface safety valves typically include a pneumatic or hydraulic actuator coupled to a gate value for selectively permitting or disallowing flow of production fluids through the flow lines. For example, surface safety valves may be installed as a secondary master valve on a well head tree or as a wing valve directly on the flow line. Surface safety valves typically include a valve body having a central axis aligned with inlet and outlet passages and a space therebetween to receive the gate that may be moved perpendicularly to open and close the valve. In the closed position, the gate surfaces typically seal against sealing rings which surround the fluid passage through the valve body.

One type of surface safety valve includes a pneumatic actuator that is operated by a pneumatic supply system that is independent of well fluids and pressures. The pneumatic surface safety valve is designed to be held open by pneumatic control pressure acting on an actuator piston. Loss of pneumatic pressure in the actuator cylinder permits the well or flow line pressure acting on the gate along with the force exerted by a closing spring to drive the gate into a closed position. Such an actuator may be termed "fail safe," since in the event of an emergency causing loss of pneumatic pressure, the actuator will automatically cause the valve to assume the safe or closed state.

It has been found, however, that the use of pneumatic controlled actuators for surface safety valves is limited due to the size requirements of the actuator piston needed to operate gate valves particularly for high pressure and high volume flow lines which may require large bore gate valves. In addition, due to condensation and contamination within the air system utilized for pneumatic actuation, it has been found that venting of the air into the atmosphere is environmentally unsatisfactory.

To overcome the size limitation of pneumatic controlled actuators, another type of surface safety valve utilizes a hydraulic actuator that employs a hydraulic circuit to operate the actuator and to open and close the surface safety valve. The hydraulic actuators are typically part of a large hydraulic system that is controlled by a remote hydraulic control panel. As with the pneumatic actuators, the hydraulic actuators typically operate by acting hydraulic control pressure on an actuator piston. It has been found, however, that the gate and actuator piston in a hydraulic system will stroke at a limited speed due to the flow rate of hydraulic fluid and the volume of hydraulic fluid that is typically used in hydraulic systems.

Along with the surface safety valve on the well head, it is common for producing wells to include a subsurface safety valve located in the well production tubing several hundred feet below the ground surface. Subsurface safety valves may typically be flapper valves or ball valves which may be carried in a tubing connection or may be installed and set in place by wireline. Subsurface safety valves are typically operated using hydraulic fluid to operate the actuator to an open position. As with hydraulic actuated surface safety valves, when an out of range condition occurs, hydraulic pressure is released and the subsurface safety valve will actuate to the valve closed position. It has been found, however, that as with hydraulic actuated surface safety valves, the volume of hydraulic fluid in the hydraulic system affects the speed and depth at which the subsurface safety valves will operate.

Therefore, a need has arisen for a control system for actuating surface safety valves and subsurface safety valves that minimizes the volume of hydraulic fluid necessary to operate a hydraulic actuator between the valve closed position and the valve open position. A need has also arisen for such a control system that eliminates the need for a remote hydraulic control panel through which hydraulic fluid is circulated to multiple hydraulically controllable devices. Further, a need has arisen for such a control system that may be attached to existing surface safety valve actuator and subsurface safety valve actuators.

SUMMARY OF THE INVENTION

The present invention disclosed herein comprises an electrohydraulic control unit for operating the hydraulic actuators of surface safety valves and subsurface safety valves. Each control unit includes a closed loop reservoir of hydraulic fluid that minimizes the volume of hydraulic fluid necessary to operate the actuators and eliminates the need for a remotely located hydraulic control panel by utilizing a low voltage computer operated electrical system for operating the control units. The control units may be attached to existing surface safety valve actuators and subsurface safety actuators thereby minimizing the cost of operating the system of the present invention.

The electrohydraulic control unit of the present invention is operably associated with the actuator of a safety valve such that the safety valve may be operated between open and closed positions. The electrohydraulic control unit comprises a housing having a hydraulic fluid reservoir that is in fluid communication with the chamber of the actuator. A piston disposed within the housing regulates the flow of the hydraulic fluid between the hydraulic fluid reservoir and the chamber of the actuator. An electric motor is securably attached to the housing and has a shaft that is selectively rotatable. A converter, such as a planetary gear mechanism, is used to transform the rotational motion of the shaft to translational motion of the piston, thereby shifting the piston of the actuator to operate the safety valve between open and closed positions.

The planetary gear mechanism may include a first planetary gear housing coupled to the shaft of the electric motor, one or more gears coupled to the first planetary gear housing, a transmission ring coupled to the gears and a second planetary gear housing coupled to the gears. The second planetary gear housing may be coupled to a circulating ball nut that is coupled to a worm screw. The worm screw is mounted to the piston of the electrohydraulic control unit.

The electrohydraulic control unit may include a torque limiter that is selectively engageable with the planetary gear mechanism to selectively permit and prevent the translational motion of the piston. The torque limiter may comprises a solenoid operably supporting a locking member that is selectively engageable with a recess in the transmission ring. One or more centralizers may also engage recesses in the transmission ring.

In the method of the present invention, a safety valve is actuated between open and closed positions by operably coupling an electrohydraulic control unit to the actuator of the safety valve to provide a path for fluid communication between a hydraulic fluid reservoir of the electrohydraulic control unit and the actuator. The piston disposed within the hydraulic fluid reservoir is then used to regulate the flow of the hydraulic fluid between the hydraulic fluid reservoir and the actuator. Upon energizing an electric motor to selectively rotate a shaft, the rotational motion of the shaft is transformed into translational motion of the piston to actuate the safety valve.

BRIEF DESCRIPTION OF THE DRAWINGS

For a more complete understanding of the features and advantages of the present invention, references now made to the detailed description of the invention along with the accompanying figures in which corresponding numerals in the different figures refer to corresponding parts and in which.

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
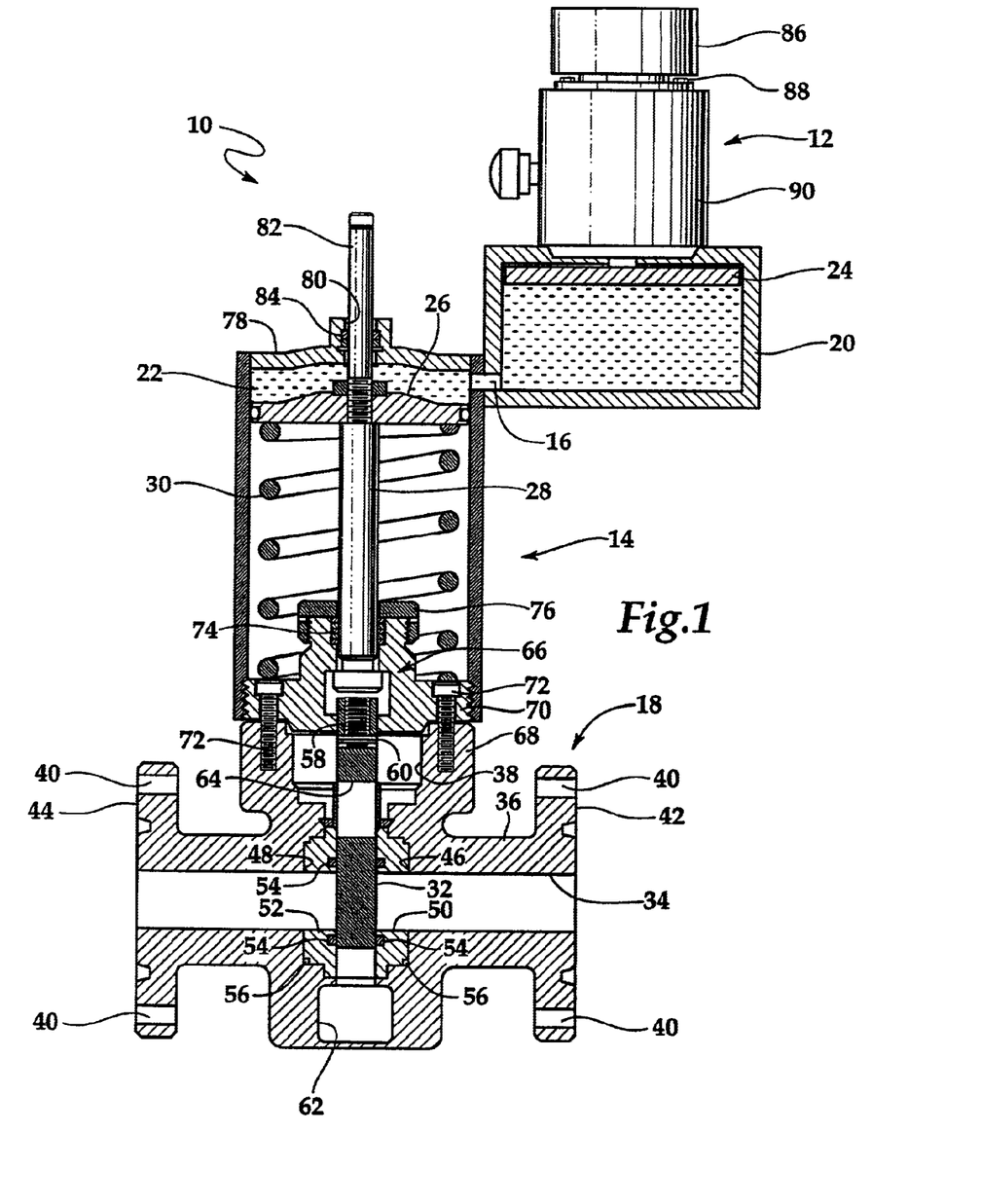
FIG. 1 is a side elevation view, partly in section, of an electrohydraulic control unit of the present invention coupled to a hydraulic actuator of a surface safety valve shown in the closed position.

Referring now to FIG. 1, an electrohydraulic control unit coupled to a hydraulic actuator of a surface safety valve is depicted in generally designated 10. Electrohydraulic control unit 12 is coupled to hydraulic actuator 14 via hydraulic coupling 16. Hydraulic actuator 14 is assembled onto surface safety valve 18 which is designed for controlling the flow of fluids through a flow line from a source, such as a well head, to a remote processing or storage location. Surface safety valve 18 is adapted for connection into the flow line adjacent to the well for shutting flow through the flow line at the well head in the event that the pressure in the flow line downstream of surface safety valve 18 exceeds a predetermined maximum value or falls below a predetermined minimum value. Hydraulic actuator 14 is designed to close surface safety valve 18 quickly upon loss of hydraulic pressure from electrohydraulic control unit 12.

Figure 2:
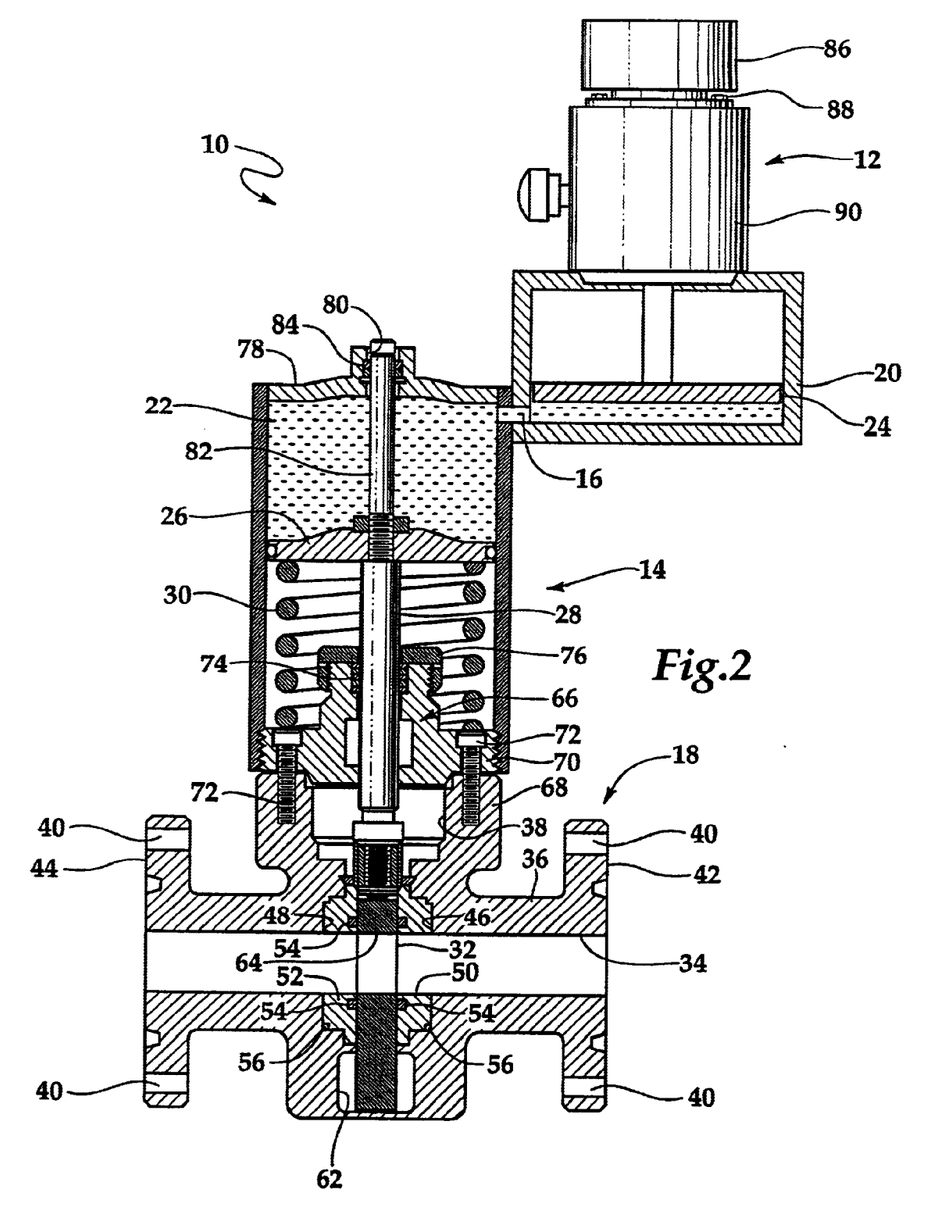
FIG. 2 is a side elevation view, partly in section, of an electrohydraulic control unit of the present invention coupled to a hydraulic actuator of a surface safety valve shown in the open position.

Hydraulic actuator 14 is energized by a closed loop, environmentally sound hydraulic system contained within electrohydraulic control unit 12 and hydraulic actuator 14. Surface safety valve 18 is initially opened by transmitting hydraulic fluid from the hydraulic reservoir located in chamber 20 of electrohydraulic control unit 12 to chamber 22 of hydraulic actuator 14. Hydraulic fluid is transferred from electrohydraulic control unit 12 to hydraulic actuator 14 by operation of piston 24 of electrohydraulic control unit 12 against the hydraulic fluid within chamber 20. The hydraulic fluid is forced out of chamber 20 through hydraulic coupling 16 and into chamber 22 of hydraulic actuator 14. The hydraulic fluid acts on piston 26 to drive surface safety valve 18 to the fully opened position, as best seen in FIG. 2. Loss of hydraulic pressure within chamber 22 of hydraulic actuator 14 allows the pressure within the flow line to act on gate stem 28 in combination with a bias force exerted by closing spring 30 to detract piston 26 and move valve gate 32 to a position that blocks the flow through bore 34 of surface safety valve 18, as best seen in FIG. 1. Bore 34 of surface safety valve 18 provides a longitudinal flow passage for connection into a production flow line. Surface safety valve 18 includes a body portion 36 through which bore 34 is formed and in which a gate cavity 38 is formed. Valve body portion 36 may be securely coupled to the flow line by connector bolts or studs which are extended through aligned apertures 40 in flange 42 and flange 44.

Seat recesses 46, 48 are formed internally of valve body portion 36 and are adapted to receive valve seat elements 50, 52 respectively. Valve seat elements 50, 52 have annular grooves formed on their facing surfaces for receiving annular face seal rings 54, while the opposite side surfaces of each valve seat element 50, 52 receives rear sealing elements 56.

Connection between valve gate 32 and gate stem 28 is accomplished by threaded coupling 58 which is secured against release by a connection pin 60. In the open position, as seen in FIG. 2, valve gate 32 is slidably receive within gate cavity 62. In this configuration, aperture 64 of valve gate 32 is aligned with bore 34 of surface safety valve 18 such that fluid flow may proceed through the flow line.

Surface safety valve 18 will remain in the open position as long as hydraulic pressure is maintained within chamber 22 of hydraulic actuator 14. In the event hydraulic control pressure is interrupted, for example in response to operator control or in response to the detection of an unscheduled operating condition such as a sudden decrease or increase in flow line pressure, closing spring 30 will drive piston 26 upwardly thus moving valve stem 28 and gate 32 toward the closed position, as seen in FIG. 1. In this configuration, valve gate 32 engages annular sealing ring 54 for blocking flow through bore 34 of surface safety valve 18.

Hydraulic actuator 14 includes a bonnet 66 for coupling hydraulic actuator 14 onto surface safety valve 18. Body portion 36 of surface safety valve 18 has a coupling collar 68 for engaging bonnet 66. Bonnet 66 is provided with an annular flange 70 which is secured onto coupling collar 68 by threaded bolt connectors 72.

Gate stem 28 extends through the center of bonnet 66 and has a sealing engagement against static annular packing seal 74. Packing seal 74 is retained within bonnet 66 by a threaded packing collar 76. The engagement of packing seal 74 against gate stem 28 produces a fluid seal to prevent exposure of the internal components of hydraulic actuator 14 to flow line fluids.

The upper end of hydraulic actuator 14 includes a top plate 78. Top plate 78 includes a bore 80. Gate stem 28 includes an indicator stem 82 that projects through bore 80 for providing an indication of the operating mode of surface safety valve 18. In the valve open mode, indicator stem 82 is barely visible. When surface safety valve 18 has been actuated to the valve closed position, however, indicator stem 82 will project substantially above top plate 78 to indicate and verify the closed position of valve gate 32. A fluid seal is provided between indicator stem 82 and bore 80 by annual packing assembly 84.

The operation of surface safety valve 18 and hydraulic actuator 14 is controlled by electrohydraulic control unit 12. Electrohydraulic control unit 12 may be interchangeably attached to a variety of hydraulic actuators 14 which operate surface safety valves 18 of a variety of sizes and pressure ratings. Electrohydraulic control unit 12 is light weight and requires minimum space for installation and operation. Electrohydraulic control unit 12 is suitable for use in high pressure and high temperature service. Electrohydraulic control unit 12 includes an electric motor 86 which is flange mounted via threaded bolt connectors 88 to housing 90 of electrohydraulic control unit 12. Electric motor 86 may be operated by a computer controlled electrical system which may operate at a low voltage, such as 24 volts.

Figure 3:
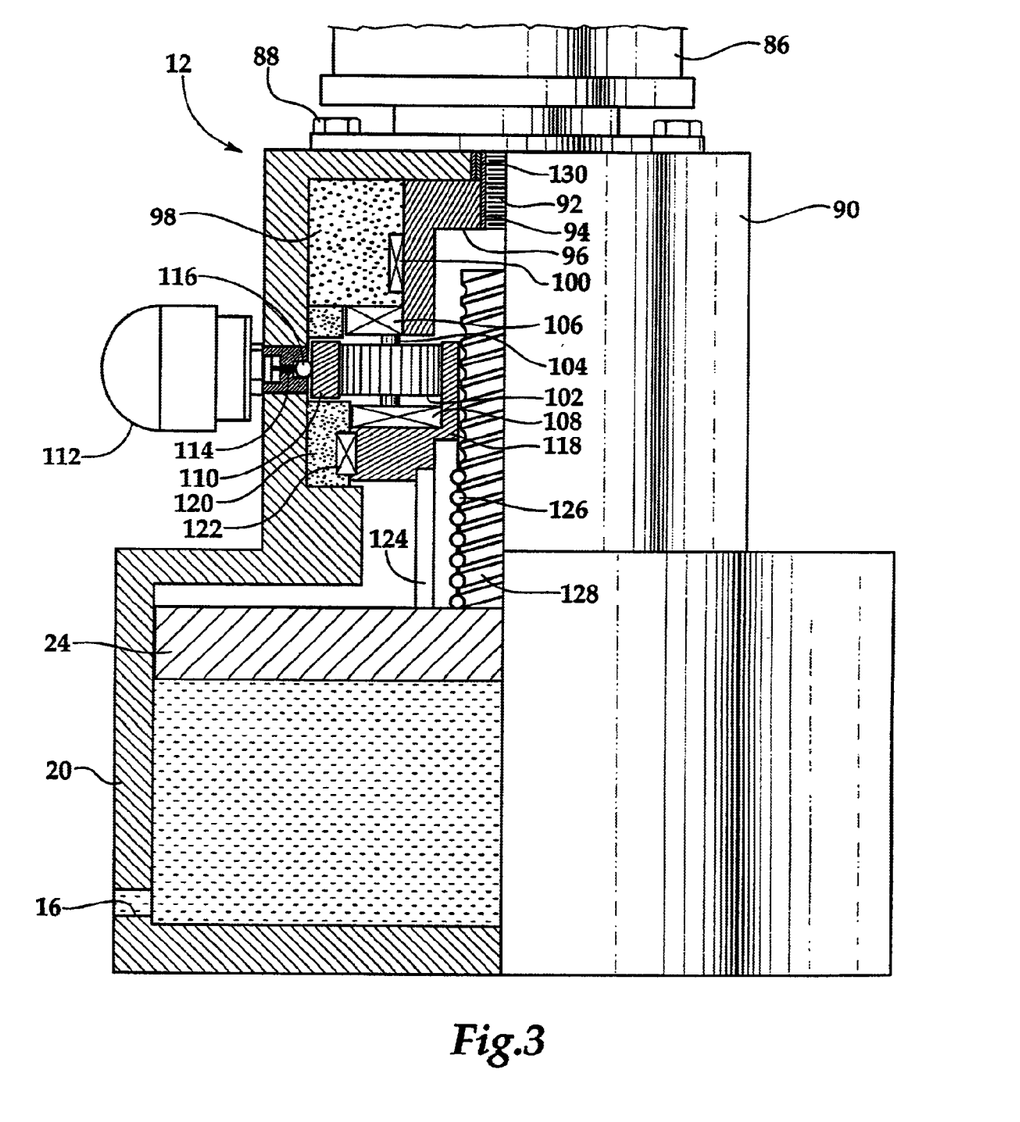
FIG. 3 is a quarter sectional view of an electrohydraulic control unit of the present invention.

As best seen in FIG. 3, electrohydraulic control unit 12 utilizes a planetary gear and worm screw to transform the rotary motion of electric motor 86 into translation motion of piston 24. This design requires minimum maintenance due to the low stresses in the gear reduction system. Extending outwardly from electric motor 86 is motor drive shaft 92 including key 94. Motor drive shaft 92 extends into housing 90 and is coupled to top planetary gear housing 96. A spacer 98 supports top planetary gear housing 96 such that top planetary gear housing 96 remains engaged with key 94. Spacer 98 may typically be constructed of a packing material. A bearing 100 is disposed between spacer 98 and top planetary gear housing 96 to provide further support to top planetary gear housing 96 and to allow top planetary gear housing 96 to rotate about the axis of electrohydraulic control unit 12.

Top planetary gear housing 96 is coupled with gears 102, only one of which is depicted. Gears 102 rotate about gear retaining pins 104. Gears 102 are supported by top load bearing 106 and bottom load bearing 108. Gears 102 engage transmission ring 110. The rotation of transmission ring 110 is controlled by solenoid 112 which selectively engages a locking member such as, drive pin 114 and ball 116, with transmission ring 110 as will be more fully explained with reference to FIG. 4. Solenoid 24 may be operated by a computer controlled electrical system that may operate at a low voltage, such as 24 volts.

Gears 102 engage bottom planetary gear housing 118. Bottom planetary gear housing 118 is supported by spacer 120. Disposed between spacer 120 and bottom planetary gear housing 118 is side load bearing 122 that allows bottom planetary gear housing 118 to rotate about the axis of electrohydraulic control unit 12. Bottom planetary gear housing 118 engages circulating ball nut 124. Circulating ball nut 124 includes a plurality of balls 126 that engage the threads of worm screw 128 which is coupled to piston 24.

In operation, when electric motor 86 and solenoid 112 are energized by the electrical system, drive pin 114 engages ball 116 with transmission ring 110 and drive shaft 92 rotates. The rotary motion of drive shaft 86 is then transformed into translation motion of piston 24. Specifically, drive shaft 92 imparts rotation to top planetary gear housing 96 via key 94. Rotary motion of top planetary gear housing 96 rotates gears 102 within the stationary transmission ring 110 which is fixed due to the engagement of ball 116 which is controlled by solenoid 112. The rotation of gears 102 within transmission ring 110 allows transmission of torque to bottom planetary gear housing 118. The rotary motion of bottom planetary gear housing 118 about the axis of electrohydraulic control unit 12 causes balls 126 to circulate within circulating ball nut 124 which imparts linear motion to worm screw 128. As worm screw 128 translates, piston 24 is driven downwardly, thereby forcing hydraulic fluid from chamber 20 of electrohydraulic control unit 12 into chamber 22 of hydraulic actuator 14 which actuates surface safety valve 18 as discussed with reference to FIGS. 1 and 2. Once surface safety valve 18 is actuated to the open position, a position indicator (not shown) within surface safety valve 18 may signal the electrical system to switch off electric motor 86. Solenoid 112, however, remains energized such that ball 116 is engaged with transmission ring 110. In this configuration, piston 24 is held in place as rotation of circulating ball nut 124 is prevented.

In the event that electrical power is interrupted to solenoid 112, for example in response to the emergency shut down system, operator control, failure in the electrical system or in response to the detection of an unscheduled operating condition such as a sudden decrease or increase in flow line pressure, drive pin 114 is retracted into solenoid 112 such that ball 116 disengages transmission ring 110. Once transmission 110 is free to rotate, gears 102, bottom planetary gear housing 118 and circulating ball nut 124 are free to operate such that the hydraulic pressure exerted against piston 24 causes worm screw 128 to translate without the transmission of torque through to top planetary gear housing 96 or electric motor 86. As worm screw 128 translates, hydraulic fluid is returned to chamber 20 of electrohydraulic control unit 12 from chamber 22 of hydraulic actuator 14 via hydraulic coupling 16. As the hydraulic pressure holding piston 26 of hydraulic actuator 114 is removed and closing spring 30 upwardly shifts piston 26, surface safety valve 18 returns to the closed position as described above with reference to FIGS. 1 and 2. In order to further protect electric motor 86 from reverse drive during the closing of surface safety valve 18, a sprag clutch 130 may be position between drive shaft 92 and housing 90 of electrohydraulic control unit 12.

Figure 4:
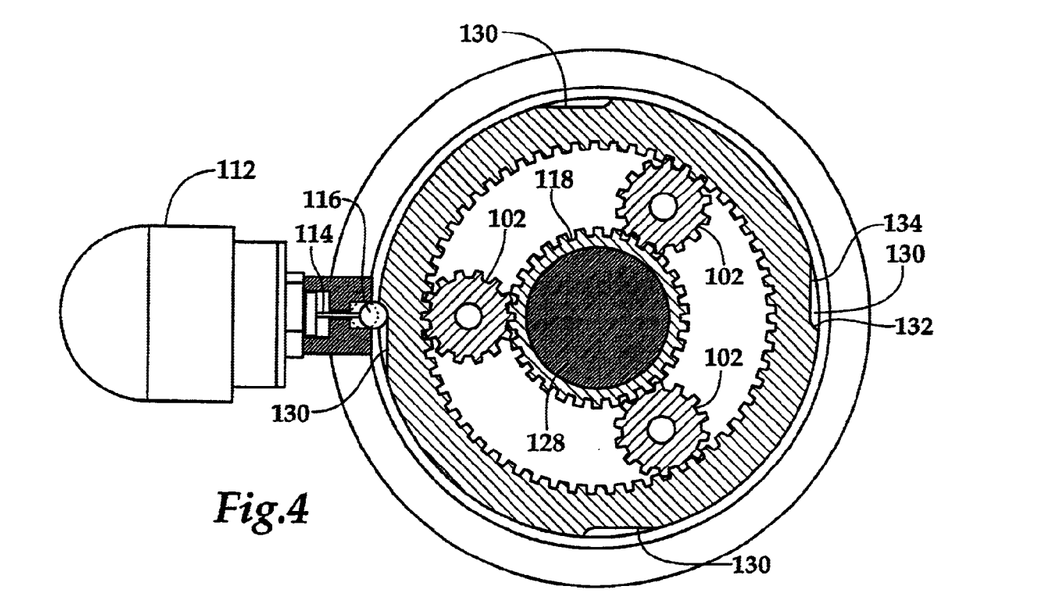
FIG. 4 is a top view, partly in section, of an electrohydraulic control unit of the present invention.

Referring now to FIG. 4, one embodiment of a transmission ring retention system is depicted. Transmission ring 110, gears 102, bottom planetary gear housing 118 and worm screw 128 are housed within housing 90 of electrohydraulic control unit 12. Transmission ring 110 includes four recesses 130 for receiving ball 116 when solenoid 112 is energized. Recesses 130 are designed to prevent rotation, in either direction, of transmission ring 110 within predetermined torque conditions. For example, each recess 130 may include a steep sloping surface 132 and a gradual sloping surface 134 depending upon the desired maximum allowable torque for rotation in a particular direction. The torque limitation feature of the present invention may be used to prevent over torque of electric motor 86 or to allow surface safety valve 18 to close if the hydraulic pressure exerted on piston 24 exceeds a predetermined level. It should be noted by one skilled in the art that the exact profile of recesses 130 will be selected based upon factors including the capacity of electric motor 86, the size of electrohydraulic control unit 12 as well as the production rate and pressure of fluids being produced through the flow lines.

Even though the locking member has been described as solenoid 24 operating pin 114 and ball 116, it should be understood by one skilled in the art that other locking members having alternate configuration may be used and that fall within the scope of the present invention. For example, the solenoid may have a direct engagement with transmission ring 110. Likewise, alternative designs may be desirable depending upon the profile of recesses 130. For example, a cylindrical or barrel shaped member may be used instead of ball 116 to engage transmission ring 110.

Figure 5:
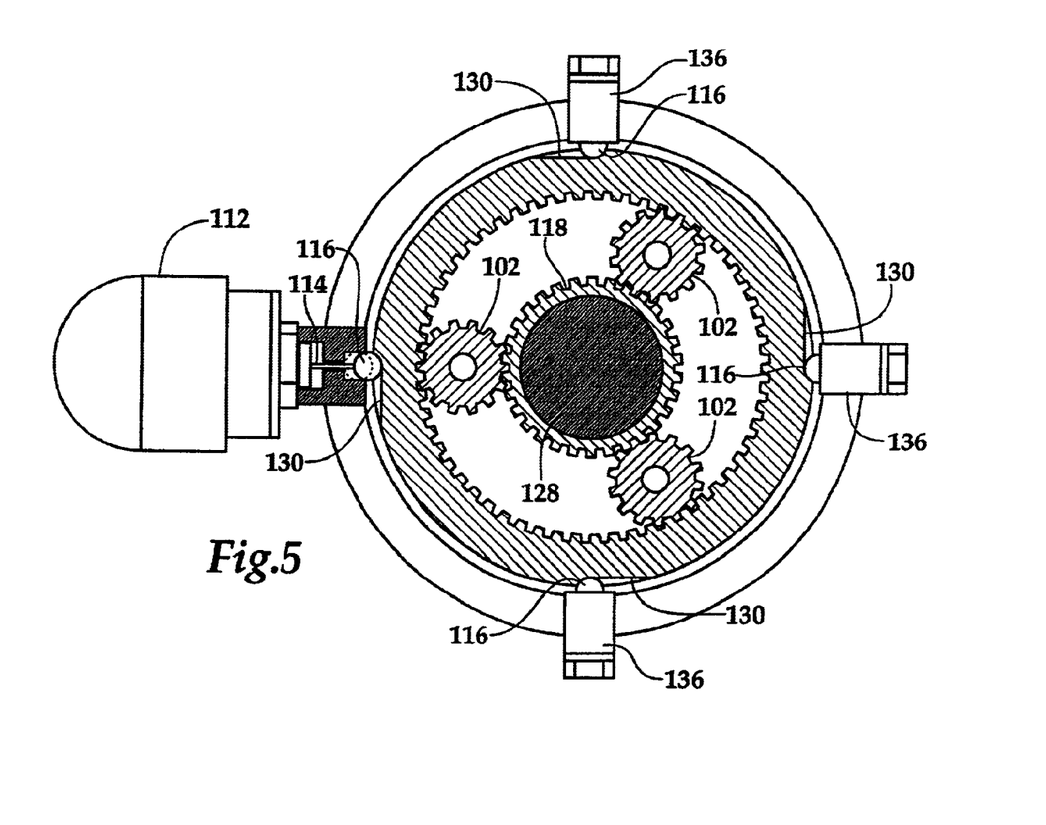
FIG. 5 is a top view, partly in section, of an electrohydraulic control unit of the present invention.

Referring now to FIG. 5, an alternate embodiment of a transmission ring retention system is depicted. In this embodiment, in addition to ball 116 associated with solenoid 112, additional balls 116 are mounted within centralizers 136 to engage transmission ring 110. Centralizers 136 are spaced around transmission ring 110 at ninety degree increments. Centralizers 136 are used to equalize the forced distribution about transmission ring 110 which would otherwise be transmitted to rotating components within electrohydraulic control unit 12. Centralizers 136 help to stabilize transmission ring 110 and may provide additional torque control over transmission ring 110 if, for example, suitably high bias springs within centralizers 136 are used to engage balls 116 with transmission ring 110.

Figure 6:
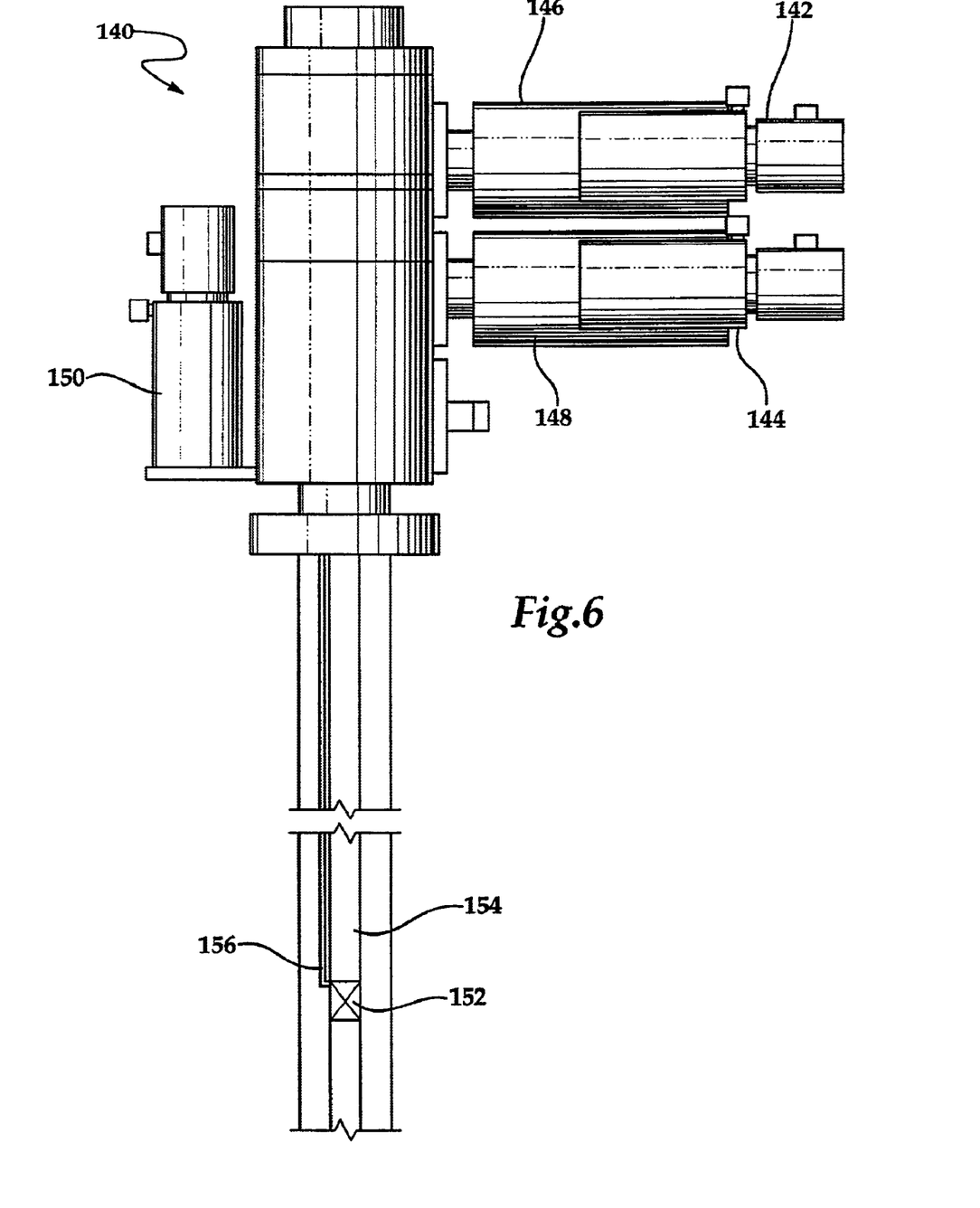
FIG. 6 is a schematic illustration of a well head installation including two electrohydraulic control units operating surface safety valves and one electrohydraulic control unit operating a subsurface safety valve.

Even though electrohydraulic control unit 12 has been described with reference to actuating valve gate 32 of surface safety valve 18, it should be understood by one skilled in the art that electrohydraulic control unit 12 of the present invention is well suited for hydraulically actuating other devices when it is desirable to have a closed loop hydraulic system including, but not limited to, ball valves and choke valves. For example, as depicted in FIG. 6, three electrohydraulic control units are operating at a well head installation that is generally designated 140. Electrohydraulic control units 142, 144 are respectively coupled to hydraulic actuators 146, 148. Hydraulic actuator 146 may be used to operate a crown valve while hydraulic actuator 148 may be used to operate a surface safety valve such as that discussed with reference to FIGS. 1 and 2 above. Electrohydraulic control unit 150, however, is being used to control the actuation of subsurface safety valve 152. Subsurface safety valve 152 is disposed in well production tubing 154 and may be several hundred feet below the ground surface. Subsurface safety valve 152 may utilize a flapper valve or a ball valve to shut-in production through tubing 154. The operation of subsurface safety valve 152 is controlled by electrohydraulic control unit 150 via hydraulic control line 156. Together, electrohydraulic control unit 150, hydraulic control line 156 and the actuation device of subsurface safety valve 152 provide a closed loop hydraulic system which is suitably controlled by electrohydraulic control unit 150 in the manner described above with reference to FIG. 3.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A safety system for a flow line to selectively permit and prevent fluid flow therethrough, the system comprising:

a safety valve disposed along the flow line and moveably actuatable between open and closed positions;

a hydraulic actuator operably mounted to the safety valve to actuate the safety valve between the open and closed positions; and an electrohydraulic control unit operably coupled to the hydraulic actuator, the electrohydraulic control unit comprising a hydraulic fluid reservoir and a piston for selectively transferring hydraulic fluid between the hydraulic fluid reservoir and the hydraulic actuator via a coupling, the electrohydraulic control unit also comprising an electric motor having a selectively rotatable shaft and a converter configured to transform the rotational motion of the shaft to translational motion of the piston, thereby controlling the transfer of the hydraulic fluid from the hydraulic fluid reservoir to the hydraulic actuator.

2. The safety system as recited in claim 1 wherein the electrohydraulic control unit further comprises a torque limiter selectively engageable with the converter to selectively permit and prevent the translational motion of the piston.

3. The safety system as recited in claim 2 wherein the torque limiter further comprises a solenoid.

4. The safe system as recited in claim 1 wherein the converter further comprises a planetary gear mechanism.

5. The safety system as recited in claim 4 wherein the planetary gear mechanism further comprises a first planetary gear housing coupled to the shaft, at least one gear coupled to the first planetary gear housing, a transmission ring coupled to the at least one gear and a second planetary gear housing coupled to the at least one gear.

6. The safety system as recited in claim 5 wherein the at least one gear further comprises three gears.

7. The safety system as recited in claim 1 wherein the converter further comprises a circulating ball nut.

8. The safety system as recited in claim 1 wherein the converter further comprises a worm screw that is rotatably mountable to the piston.

9. A method for actuating a safety valve between open and closed positions comprising:

operable coupling an electrohydraulic control unit to an actuator of the safety valve to provide a path for fluid communication between a hydraulic fluid reservoir of the electrohydraulic control unit and the actuator;

regulating the flow of the hydraulic fluid between the hydraulic fluid reservoir and the actuator with a piston disposed within the electrohydraulic control unit;

energizing an electric motor to selectively rotate a shaft; and transforming the rotational motion of the shaft to translational motion of the piston, thereby actuating the safety valve.

10. The method as recited in claim 9 further comprising selectively engaging a torque limiter to permit and prevent the translational motion of the piston.

11. The method as recited in claim 10 wherein the step of selectively engaging a torque limiter further comprises engaging a solenoid controlled locking member with a first recess in a transmission ring.

12. The method as recited in claim 11 further comprising the step of centralizing the transmission ring within the electrohydraulic control unit by engaging at least one centralizer within a second recess in the transmission ring.

13. The method as recited in claim 9 wherein the step of transforming the rotational motion of the shaft to translational motion of the piston further comprises engaging balls within a circulating ball nut with a worm screw that is securably mountable to the piston.

* * * * *